(No Model.)
G. CLEMENT.
DOOR FOR CAT OR DOG HOUSES.
No. 499,656. Patented June 13, 1893.
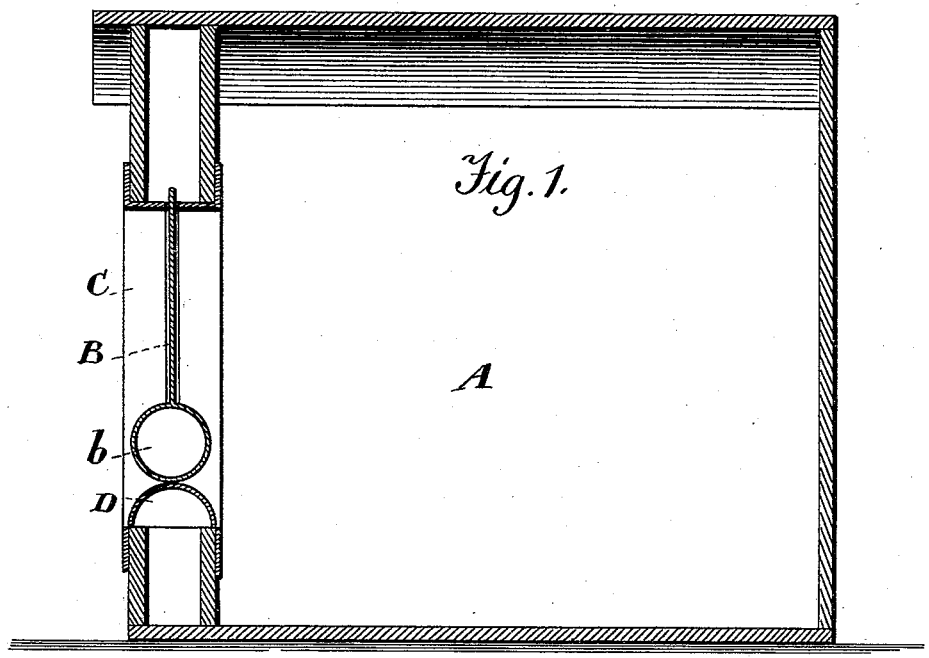
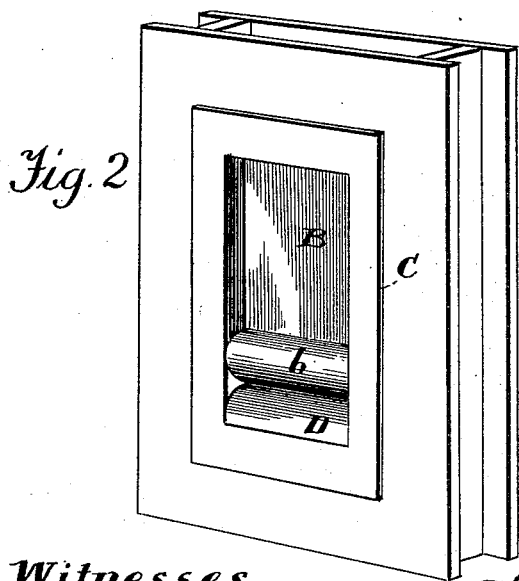
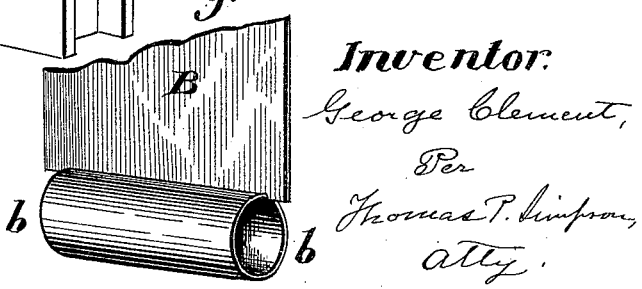
Witnesses.
A. Ruppert.
H. A. Daniels
Inventor.
George Clement,
Per
Thomas P. Simpson,
Atty.

UNITED STATES PATENT OFFICE.

GEORGE CLEMENT, OF DEADWOOD, SOUTH DAKOTA.

DOOR FOR CAT OR DOG HOUSES.

SPECIFICATION forming part of Letters Patent No. 499,656, dated June 13, 1893.

Application filed June 15, 1892. Serial No. 436,874. (No model.)

*To all whom it may concern:*

Be it known that I, GEORGE CLEMENT, a citizen of the United States, residing at Deadwood, in the county of Lawrence and State of South Dakota, have invented certain new and useful Improvements in Doors for Cat or Dog Houses; and I do hereby declare the following to be a full, clear, and exact description of the invention, such as will enable others skilled in the art to which it appertains to make and use the same.

The special object of the invention is to make a door, in cat or dog houses, which can be easily opened for the entrance or exit of the animal by his own exertion and which will automatically close by gravity as soon as he has passed through it.

Figure 1 of the drawings is a vertical section of a cat or dog house provided with my improved door; Fig. 2 a perspective view of the door and the frame in which it moves up and down. Fig. 3 is a perspective view of the door, partly broken away, to show how the door projects on each side beyond the roll so that it may slide easily in the door-frame grooves.

In the drawings, A represents the house, B the door and C the door-frame. The front of house is provided with a rectangular opening of suitable height and width to allow the sides to pass within the parallel boarding of the door-frame C, while the door has its sides also fitting loosely within the framing C so as to permit it to slide vertically up and down therein.

The door B is constructed of metal or any preferred material, and is provided at the lower end with a curved bottom which rests upon the curved sill D. The curves on the bottom $b$ and sill D allow the animal to pass under it with the head and cause it to rise as the animal advances and then to fall by its own gravity as soon as he passes through.

I preferably make the bottom of door B cylindrical and of less width than the body of door so that the latter will project beyond it on each side and thus readily slide up and down in the grooves of the door-frame C, as shown in Fig. 3 of the drawings.

In practice, it is found very easy to teach a dog or cat how to go in and out of his house, while the closing of the door keeps out the cold wind and prevents intruders from finding their way to the interior.

Having thus described all that is necessary to a full understanding of my invention, what I claim as new, and desire to protect by Letters Patent, is—

The combination of a door B having a cylindrical bottom, the sill D having a corresponding upward curve, and the door-frame grooved to allow the door to slide up and down therein, the bottom of the door being of less width than the body thereof as and for the purpose set forth.

In testimony whereof I have affixed my signature in presence of two witnesses.

GEORGE CLEMENT.

Witnesses:
    JAMES CLEMENT,
    SAMUEL H. SWEET.